(12) United States Patent
Masui

(10) Patent No.: US 8,302,184 B2
(45) Date of Patent: Oct. 30, 2012

(54) INFORMATION PROCESSING APPARATUS, INFORMATION PROCESSING METHOD AND STORAGE MEDIUM

(75) Inventor: Takanori Masui, Kanagawa (JP)

(73) Assignee: Fuji Xerox Co., Ltd, Tokyo (JP)

( * ) Notice: Subject to any disclaimer, the term of this patent is extended or adjusted under 35 U.S.C. 154(b) by 1195 days.

(21) Appl. No.: 12/054,642

(22) Filed: Mar. 25, 2008

(65) Prior Publication Data

US 2008/0256626 A1 Oct. 16, 2008

(30) Foreign Application Priority Data

Apr. 11, 2007 (JP) ................................ 2007-104164

(51) Int. Cl.
*G06F 7/00* (2006.01)
(52) U.S. Cl. .................. 726/20; 726/4; 726/9; 713/172; 713/173; 713/176
(58) Field of Classification Search .................. 713/172, 713/173, 176; 726/4, 9, 20
See application file for complete search history.

(56) References Cited

U.S. PATENT DOCUMENTS

| | | | |
|---|---|---|---|
| 6,348,974 B1 | 2/2002 | Takahashi et al. | |
| 2002/0053028 A1 | 5/2002 | Davis | |
| 2002/0124167 A1 | 9/2002 | Toyota et al. | |
| 2004/0088560 A1* | 5/2004 | Danks ........................... | 713/200 |
| 2004/0103202 A1* | 5/2004 | Hildebrand et al. .......... | 709/229 |
| 2007/0074033 A1* | 3/2007 | Adams et al. ................. | 713/176 |
| 2009/0022477 A1* | 1/2009 | Petkovic et al. ................ | 386/83 |

FOREIGN PATENT DOCUMENTS

| | | |
|---|---|---|
| JP | 10304111 A | 11/1998 |
| JP | 2002259305 | 9/2002 |
| JP | 2003224728 | 8/2003 |
| JP | 2004533730 A | 11/2004 |
| JP | 2004347630 A | 12/2004 |
| JP | 2006134141 A | 5/2006 |
| JP | 2006262408 A | 9/2006 |
| WO | 0235764 A2 | 5/2002 |

OTHER PUBLICATIONS

Japanese Notice of Grounds for Rejection with English translation thereof, issued on Dec. 13, 2012 in connection with Japanese Patent Application No. 2007-104164, 7 pages.

* cited by examiner

*Primary Examiner* — Eleni Shiferaw
*Assistant Examiner* — Paul Callahan
(74) *Attorney, Agent, or Firm* — Gesmer Updegrove LLP

(57) ABSTRACT

An information processing apparatus includes a user authentication unit that authenticates a user in a condition where an authentication medium used for authenticating the user is inserted, the authentication medium storing personal identification information of the user, a private key, and a software program for using the private key and including a processor for running the software program, to thereby establish a verified state in which the user is allowed to use the apparatus, a data processor that performs data processing including private key processing, a processing completion detector that detects completion of the private key processing performed by the data processor, and a verification state changing unit that changes, the verified state of the user having been established as a result of authenticating the user to a user unverified state based on detection of the completion of the private key processing in the processing completion detector.

11 Claims, 5 Drawing Sheets

INFORMATION PROCESSING APPARATUS, INFORMATION PROCESSING METHOD AND STORAGE MEDIUM

CROSS-REFERENCE TO RELATED APPLICATIONS

This application is based on and claims priority under 35 USC 119 from Japanese Patent Application No. 2007-104164 filed on Apr. 11, 2007.

BACKGROUND

1. Technical Field

The present invention relates to an information processing apparatus, an information processing method and a storage medium.

2. Related Art

In recent years, there have been many occasions where an IC (Integrated Circuit) card (a smart card) which stores a private key of an individual user is used as a security measure. For example, when a user uses an image forming apparatus, a security application installed in the image forming apparatus requests the user to insert an IC card and input a PIN (Personal Identification Number). Upon receipt of the input, the image forming apparatus authenticates the user, and becomes capable of using the private key stored in the IC card to attach a digital signature to a scanned document, decrypt an encrypted electronic document (an encryption document), or perform other processing.

Such IC cards are categorized into two types of encryption processor equipped IC cards and encryption processor non-equipped IC cards. In addition to having a storage for the private key and the PIN which are generally contained in IC cards, the encryption processor equipped IC cards further include software programs for implementing functions of user authentication, encryption, and other processing according to instructions from a device such as, for example, an image forming apparatus, and a processor for executing the software programs. Further, readout of data such as the private key stored in the storage from the encryption processor equipped IC card to external devices is prohibited.

On the other hand, the encryption processor non-equipped IC cards are IC cards which include only a memory without having an encryption processor.

The form of using the private key stored in an IC card differs depending on the type of IC card. Because the use of encryption processor non-equipped IC cards raises the possibility that the private key will remain in a memory of an external device even after removal of the IC card, it cannot be said that the encryption processor non-equipped IC cards are completely secure.

Contrasted with such an IC card without having the encryption processor, in usage of IC cards which are equipped with the encryption processor, the IC cards internally perform, in response to instructions from an external device, processing such as encryption performed using the private key, and return a result of the processing to the external device.

Thus, because the private key is not read out to the external device, the encryption processor equipped IC cards are more effective in terms of security enhancement.

However, since the private key only exists in the IC card, it leads to a situation where the IC card should remain inserted in the device in an accessible state while the device is performing processing using the private key. When a processing time in an image forming apparatus is obviously estimated to become longer, for example, in a case where an original document having a large number of pages is scanned to create an electronic document, and the electronic document is sent after attaching a digital signature to the electronic document, it is quite conceivable that, after inserting an IC card into the image forming apparatus and completing log-in, a user moves away to perform other business activities leaving the image forming apparatus in a logged in state. When the IC card is left inserted in the image forming apparatus in a user authenticated state as in the case of this example, there arises a possibility that the private key will be illegally used by a third party. Thus, it is attempted to enhance security on the one hand by prohibiting readout of the private key from the IC card, but on the other hand the risk of unauthorized use of the IC card personally owned by the user can arise depending on usage patterns of the IC card.

SUMMARY

An information processing apparatus according to the present invention includes a user authentication unit that authenticates a user in a condition where an authentication medium used for authenticating the user is inserted, the authentication medium storing personal identification information of the user, a private key, and a software program for using the private key and including a processor for running the software program, to thereby establish a verified state in which the user is allowed to use the information processing apparatus, a data processor that performs data processing including private key processing in which the private key stored in the authentication medium is used, a processing completion detector that detects completion of the private key processing performed by the data processor, and a verification state changing unit that changes the verified state of the user having been established as a result of authenticating the user to a user unverified state, based on detection of the completion of the private key processing in the processing completion detector.

BRIEF DESCRIPTION OF THE DRAWINGS

Exemplary embodiments of the present invention will be described in detail by reference to the following figures, wherein.

DETAILED DESCRIPTION

With reference to the drawings, exemplary embodiments of the present invention will be described below.

Exemplary Embodiment 1

Figure 1:
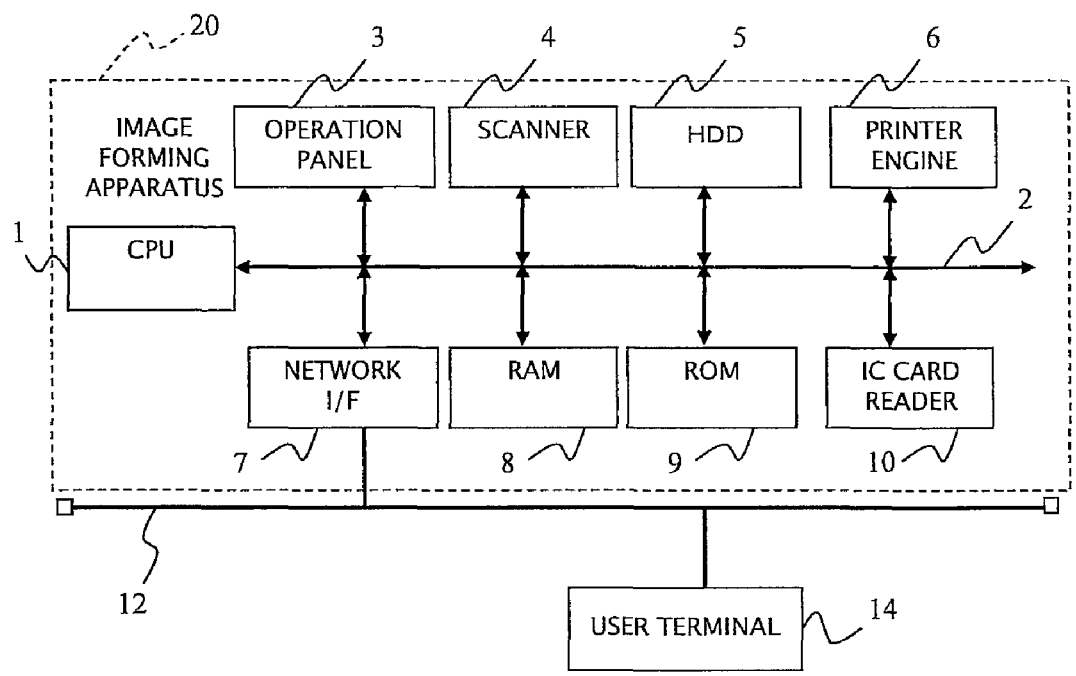
FIG. 1 shows a hardware configuration of an image forming apparatus which is one form of an information processing apparatus according to the present invention.

FIG. 1 shows a hardware configuration of an image forming apparatus which is one form of an information processing apparatus according to the present invention. The image forming apparatus is an image processor in which a computer being the information processing apparatus is mounted, and is assumed to be a multi-function machine having various functions, such as a copy function and a scanner function in the exemplary embodiment. In FIG. 1, a CPU 1 controls operation of various mechanisms including a scanner 4, a printer engine 6, and other components mounted in the apparatus according to a program stored in a read only memory (ROM) 9. An address data bus 2 connects the CPU 1 with the various mechanisms to be controlled by the CPU 1 for realizing data communication. An operation panel 3 is a user interface section for receiving instructions from a user and displaying information. The scanner 4 reads out a document placed by the user and stores the read out document as electronic data in a HDD (Hard Disk Drive) 25 or other devices. The HDD 25 stores data, such as an electronic document, which is read out by means of the scanner 4. The printer engine 6 prints an image on a print sheet in accordance with an instruction from a control program executed by the CPU 1. A network interface (I/F) 7 for connecting a network 12 is used for transmitting or receiving data such as an electronic document to or from a user terminal 14, and for accessing to the apparatus via a browser from the user terminal 14. A random access memory (RAM) 8 is used as a working memory during execution of a program or a communication buffer during the transmission/receiving of electronic data. The ROM 9 stores various programs related to the controlling of this apparatus, encryption of electronic data, and the transmission/receiving of electronic data. Each component which will be described below is caused to perform a predetermined processing function by executing the various programs. An IC card reader 10 sends or receives data to or from an inserted IC card.

Here, in this exemplary embodiment, an authentication medium used for authenticating a user is a medium which stores personal identification information of the user, a private key, and a software program using the private key, in addition to including a processor for running the software program, and the above-described encryption processor equipped IC card is assumed as the authentication medium. In relation to the use of such an IC card, an IC card reader 10 is connected to the image forming apparatus 20. It should be noted that although a processor generally refers to a chip in which execution of programs and various arithmetic operations are performed as centralized processing, the processor mounted on the authentication medium in particular runs the software program stored in the authentication medium. Further, an IC card refers to a card in which an IC is incorporated. On the other hand, a smart card refers to a plastic card in which semiconductor components, such as a CPU and a memory, are incorporated. However, the authentication medium of the same type may be referred to as the IC card or the smart card in some cases. In this exemplary embodiment, the term "IC card" is used as generic name for those cards. It should be noted that although it is considered that IC cards are in the mainstream as the authentication medium equipped with the encryption processor and used for user authentication in the present situation, storage media such as, for example, a USB (Universal Serial Bus) memory will be applicable to the authentication medium according to the present invention if and when the storage media are equipped with an encryption processor and intended for use in user authentication.

Figure 2:
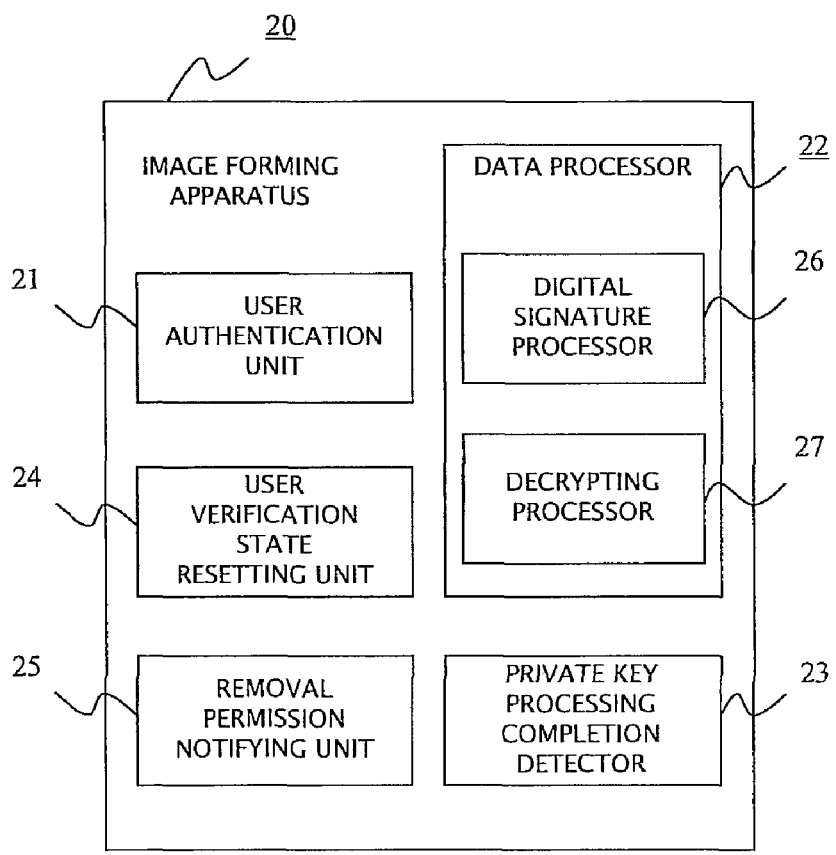
FIG. 2 is a block diagram showing a configuration of an image forming apparatus according to a first exemplary embodiment of the present invention.

FIG. 2 is a block diagram showing a configuration of the image forming apparatus 20 according to this exemplary embodiment. Components which are irrelevant to descriptions for this exemplary embodiment are not illustrated in FIG. 2.

The image forming apparatus 20 includes a user authentication unit 21, a data processor 22, a private key processing completion detector 23, a user verification state resetting unit 24, and a removal permission notifying unit 25. The user authentication unit 21 authenticates a user in a state where an IC card remains inserted in the IC card reader 10. The data processor 22 which generally performs data processing instructed from a user particularly performs processing in which the private key stored in the IC card is used in this exemplary embodiment. In particular, such data processing performed using the private key stored in IC cards is referred to as private key processing in this exemplary embodiment. The private key processing completion detector 23 detects completion of active private key processing performed by the data processor 22. The data processor 22 includes a digital signature processor 26 and a decrypting processor 27 each of which is provided as a unit for performing the private key processing. The digital signature processor 26 uses the private key stored in the IC card to generate a digital signature which is to be added to an input electronic document. On the other hand, the decrypting processor 27 uses the private key stored in the IC card to decrypt an input encrypted document. Details of each processing will be described in a later part of this specification.

In the image forming apparatus 20 according to this exemplary embodiment, a user who wants to use the image forming apparatus 20 is not authenticated simply by inserting the IC card into the IC card reader 10, and therefore remains in a state unable to use the image forming apparatus 20. Only after a PIN is subsequently input via the operation panel 3 by the user and successfully verified in the IC card, is the user authenticated, and permitted to use the image forming apparatus 20. On the other hand, a verification state of the user is managed in an IC card in a similar manner. The IC card remains in a sate where the user is not verified and the use of the private key is disabled until the PIN of the user is correctly verified. This state is also referred to as a blocked condition in terms of a condition that the use of the private key stored in the IC card is restricted. Then, when the PIN is successfully verified in the IC card, to thereby establish a user verified state, the IC card enters a state where the use of the private key in the IC card is enabled. This state is also referred to as an unblocked condition in terms of a condition that restriction on the use of the private key in the IC card is removed. Thus, the user authenticated state in the image forming apparatus 20 is controlled separately from the user verified state in the IC card.

The user authentication unit 21 performs user authentication, to thereby set the image forming apparatus 20 to the user authenticated state and the IC card to the user verified state.

These settings are changed from the user authenticated state to the user unauthenticated state in the image forming apparatus 20 and from the user verified state to the user unverified state in the IC card, in general, when log-out is explicitly indicated through a user operation, or when automatic log-out is performed by removing the IC card from the IC card reader 10. However, at a time when the private key processing completion detector 23 detects completion of the private key processing, the user verification state resetting unit 24 according to this exemplary embodiment changes the verified state of the user in the IC card established as a result of authenticating the user to the unverified state. Further, at the time when the private key processing completion detector 23 detects the completion of the private key processing, the removal permission notifying unit 25 notifies the authenticated user of the completion of the private key processing to inform the user that the IC card is prepared for removal.

Each component 21 to 25 in the image forming apparatus 20 is implemented by cooperative operation of the computer mounted in the image forming apparatus 20 and programs running on the CPU 1 mounted in the computer.

The programs used in this exemplary embodiment may, of course, be supplied via a communication unit, or may be supplied from a computer readable recording medium, such as a CD-ROM or a DVD-ROM, in which the programs are stored. The programs supplied from the communication unit or the recording medium are installed in the computer, and the CPU 1 in the computer runs the installed program in sequence to implement various processing.

Figure 3:
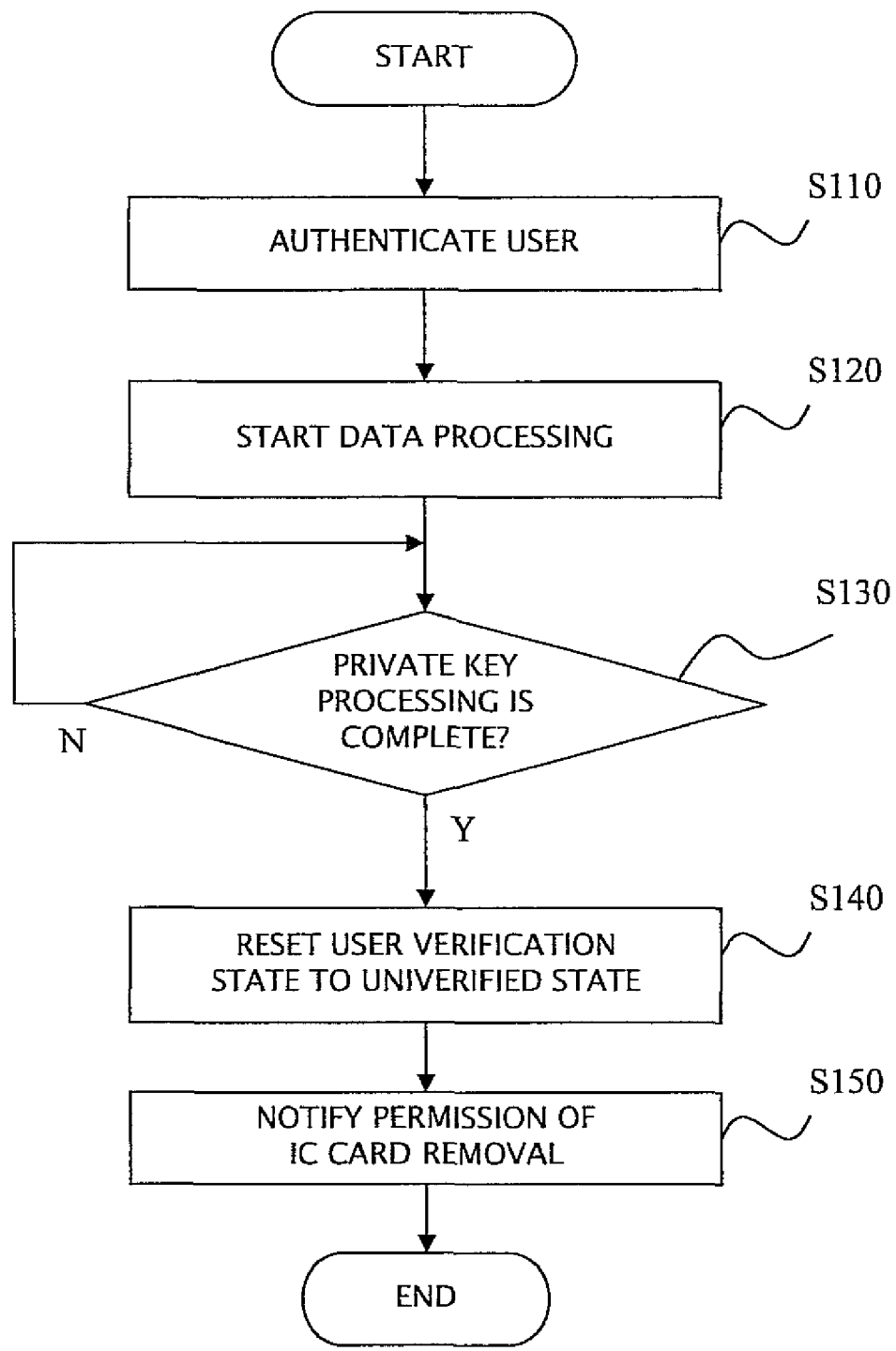
FIG. 3 is a flowchart showing a data processing including a private key processing according to the first exemplary embodiment.

Next, process steps in the data processing including the private key processing according to the exemplary embodiment will be described with reference to a flowchart shown in FIG. 3.

In step 110, after inserting a user's own IC card into the IC card reader 10, the user who wants to use the image forming apparatus 20 inputs the PIN from a predetermined log-in screen displayed on the operation panel 3. The user authentication unit 21 issues a request for authenticating the user by sending the input PIN to the IC card. In the IC card, a user authentication application which exists inside the IC card performs user authentication based on the received PIN, and returns an authentication result to the user authentication unit 21. The user authentication unit 21 performs the following processing based on the authentication result. When the user is successfully authenticated, the user authentication unit 21 allows the user to use the image forming apparatus 20, and sets the image forming apparatus 20 to the user authenticated state while specifying the user verification state in the IC card as the user verified state. Because the user verification specified at this point is retained in the IC card, the user authentication unit 21 requests the IC card to enter the user verified state. On the other hand, when the authentication results in failure, the user authentication unit 21 prohibits the user from using the image forming apparatus 20. In this case, because the unverified state is retained in the IC card before the user authentication is performed, the user authentication unit 21 does not have to re-establish the unverified state.

It is assumed that the authenticated user wants to add a digital signature to a scanned document and send the scanned document added with the digital signature to another user in step 120. In this case, the user instructs the scanning of an original document and addition of the digital signature from a predetermined operation screen displayed on the operation panel 3, and pushes down a start button after placing the original document on the scanner 4. After the push down operation, the user does not have to remain in front of the image forming apparatus 20 waiting for completion of data processing performed by the image forming apparatus 20. Therefore, the user who understands that the data processing will take a long time moves away from the image forming apparatus 20 and returns to their desk to perform other business activities by means of the user terminal 14 which may be implemented using a personal computer (PC) or the like.

When the start button is pushed down, the data processor 22 in the image forming apparatus 20 initiates processing for generating a digitally signed electronic document. The private key processing in this example corresponds to a process of attaching the digital signature. Therefore, upon the initiation of the processing for generating the electronic document, the scanner 4 reads out the original document to thereby create a scanned image. Then, the digital signature processor 26 generates a digest from the scanned image in an attempt to create a digital signature from the digest using the private key. However, because readout of the private key from the IC card is prohibited in the exemplary embodiment, the digital signature processor 26 sends to the IC card the generated digest for requesting the IC card to create the digital signature. The digital signature may be attached to the original document on a page-by-page basis or may be attached to all pages of the original document at once at the end of processing. In the IC card, the received digest is encrypted using the private key retained inside the IC card to generate the digital signature, and the generated digital signature is sent back to the digital signature processor 26. Upon receipt of the digital signature, the data processor 22 adds the digital signature received from the IC card to the scanned image (the electronic document) from which the digest is generated, and sends the scanned image (the electronic document) having the digital signature to a destination designated by the user. It should be noted that data of the scanned image (the electronic document) does not have to be sent every time the digital signature is added to each scanned image, and may be sent just once after the digital signature has been added to all the pages of the electronic document.

The above-described private key processing is repeated to generate the digital signatures which are to be added to all the scanned images. Because the private key is needed for every generation of the digital signature, the user cannot remove the IC card from the IC card reader 10 until all the digital signatures are complete. The private key processing completion detector 23 always monitors the data processor 22 until the data processor 22 completes generation of the digital signatures in the active data processing (as long as no is determined in step 130). Then, when the private key processing completion detector 23 detects completion of the private key processing based on the fact that generation of the final digital signature added to the last scanned image (the last page) is ended (when yes is determined in step 130), the user verification state resetting unit 24 resets the verified state of the user established as the result of authenticating the user to the unverified state (step 140). More specifically, because the verified state of that user is retained in the IC card, the user verification state resetting unit 24 requests the IC card to change the verification state setting from the verified state to the unverified state.

Further, upon detection of completion of the private key processing, the removal permission notifying unit 25 sends to the authenticated user a notification that removal of the IC card is permitted due to completion of the private key processing (step 150). It should be noted that a notification destination may be specified at the time of starting this processing, or a predetermined notification destination stored in the image forming apparatus 20 may be used without performing further processing. Although transmission of the notification via e-mail to the user terminal 14 or a mobile phone used by the user is assumed in this exemplary embodiment, the notification may be displayed on the operation panel 3. In this case, the notification destination is the operation panel 3. Upon receipt of the notification via e-mail or the like, the user views the contents of the notification, moves to a location of the image forming apparatus 20, and picks up the IC card from the IC card reader 10.

As described above, because it is possible to notify the user of the completion of the private key processing, a time period during which the IC card is left out of the hands of the user can be shortened compared with that in conventional technology.

Figure 4A:
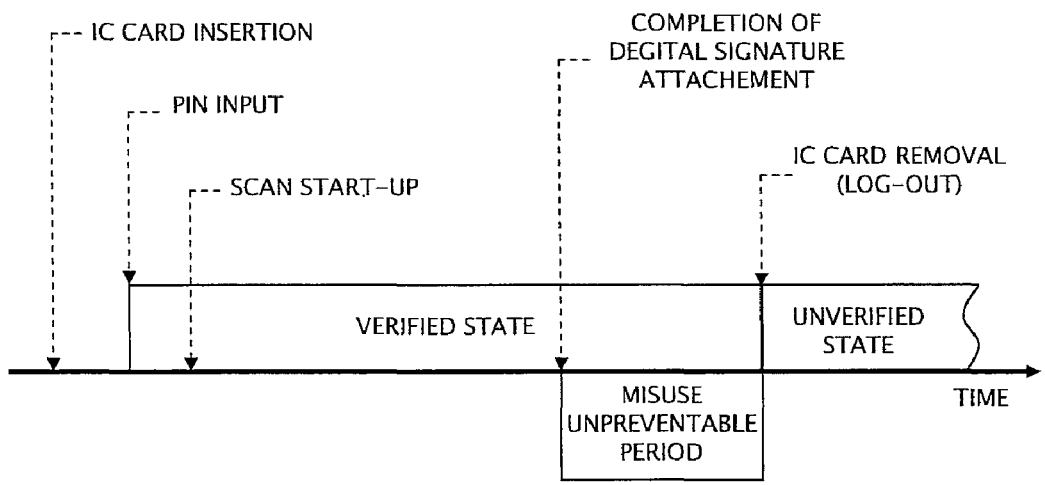
FIG. 4A schematically shows a user verified state in an IC card in which a user owning the IC card is verified with respect to the image forming apparatus, and a time period in which there is a risk of unauthorized use by a third party in related art.
Figure 4B:
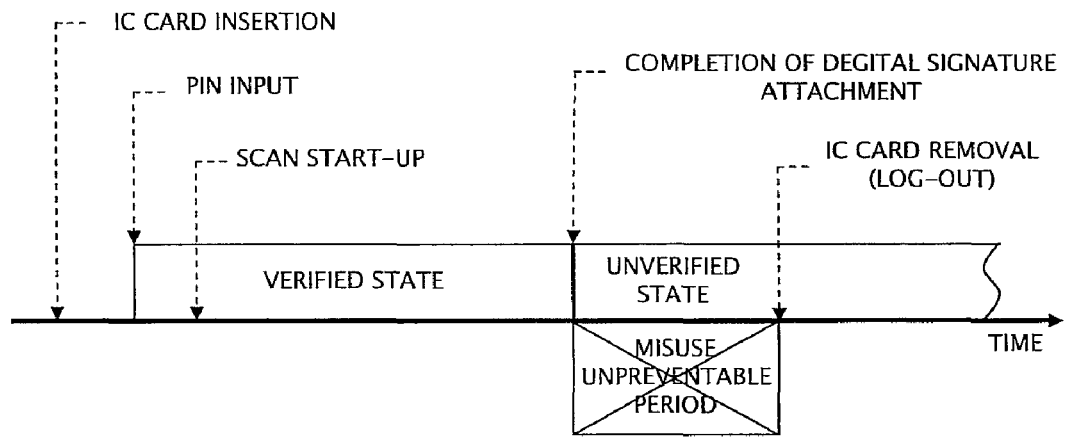
FIG. 4B schematically shows a user verified state in an IC card in which a user owning the IC card is verified with respect to the image forming apparatus, and a time period in which there is a risk of unauthorized use by a third party in the first exemplary embodiment.
Figure 4C:
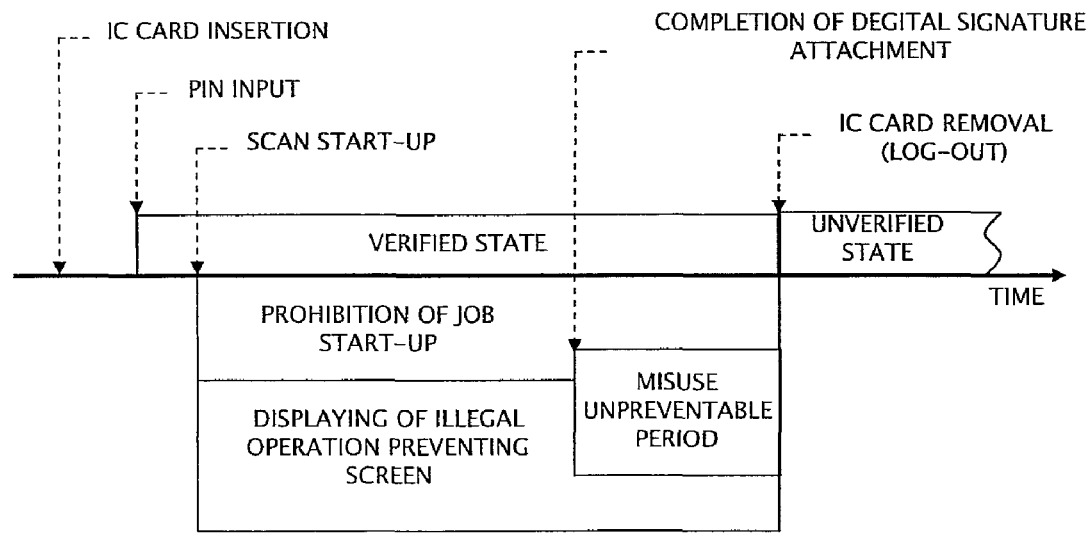
FIG. 4C schematically shows a user verified state in an IC card in which a user owning the IC card is verified with respect to the image forming apparatus, and a time period in which there is a risk of unauthorized use by a third party in a second exemplary embodiment of the present invention.

Now, the user verification state in the IC card controlled by the image forming apparatus 20 will be reviewed along with the above-described processing flow with reference to FIGS. 4A to 4C.

FIGS. 4A to 4C schematically show a relationship among events caused by user operation or data processing, the user verification state in the IC card controlled by the image forming apparatus 20, and a time period during which there is a possibility that the image forming apparatus 20 is illegally used by a third party (a misuse unpreventable period). FIG. 4A shows a conventional relationship, whereas FIG. 4B shows the relationship in this exemplary embodiment. In order to clarify characteristic features of this exemplary embodiment, a conventional transition of the user verification state in the IC card controlled by the image forming apparatus 20 will be described first with reference to FIG. 4A.

When a user is authenticated after inserting the IC card into the IC card reader 10 and inputting the PIN, the IC card enters the user verified state as described above. Here, the processing for generating the signed electronic document is initiated by pushing down the start button, to thereby start a document scan. Conventionally, in spite of the fact that the private key stored in the IC card becomes unnecessary due to the completion of digital signature attachment, the IC card remains inserted in the IC card reader 10, and the user verified state in the IC card is not reset. Therefore, the IC card is in a state vulnerable to unauthorized use by the third party. More specifically, until the time when the authenticated user who has been away from the image forming apparatus 20 gets back to remove the IC card, and automatic log-out is completed through the removal of the IC card, the third party is allowed to illegally operate the image forming apparatus 20 in order to perform unauthorized processing, such as unauthorized attachment of a digital signature using the private key stored in the IC card. In other words, a time span between the completion of digital signature attachment and the log-out conventionally exists as a period in which unauthorized use is allowed.

On the other hand, in this exemplary embodiment, the image forming apparatus 20 changes the setting of the user verification state in the IC card from the verified state to the unverified state at the time when the private key stored in the IC card becomes unnecessary due to completion of digital signature attachment. Because the verified state in the IC card is reset to the unverified state immediately upon the completion of digital signature attachment (the ending of the private key processing) without a wait for log-out as shown in FIG. 4B, the period in which unauthorized use is allowed can be eliminated according to this exemplary embodiment.

It should be noted that, during a time period from the input of the PIN to the completion of digital signature attachment, because the authorized user moves away from the image forming apparatus 20, there still remains a danger that fraud, such as, for example, illegal cancellation of active data processing, illegal initiation of other data processing after the cancellation of active data processing, or appropriation of the IC card, will be committed. However, such a fraudulent act can be detected easily from imperfect output (of the signed electronic document) or other traces.

The example has been described above in which the processing for generating a digitally signed electronic document is performed. Next, another example of data processing in which an encrypted electronic document is decrypted and printed out will be described. Also in this processing, unauthorized use can be prevented in the most effective manner possible. This processing will be described with reference to the same flowchart of FIG. 3 referenced in the above-described previous example. It should be noted that descriptions regarding identical process steps may not repeated, as appropriate. Here, an electronic document is encrypted using a data encryption key generated from random numbers in the user terminal 14 or other devices, and the data encryption key is encrypted using a public key of a user to generate an encrypted data encryption key. Then, the encrypted electronic document combined with the encrypted data encryption key becomes an encryption document. The encryption document can be only decrypted by means of the private key of the user.

It is assumed that after the user is authenticated (step 110), the authenticated user wants to print the encryption document owned by the user. In this case, the user specifies the encryption document being an object to be printed from a predetermined operation screen displayed on the operation panel 3, and pushes down a print button. After the push down operation, because there is no reason to stay in front of the image forming apparatus 20 awaiting completion of the data processing in the image forming apparatus 20, the user is assumed to move away from the image forming apparatus 20 similarly to the previous example.

The pushing down of the print button causes the data processor 22 in the image forming apparatus 20 to start print processing. The private key processing in this example corresponds to the decrypting of an electronic document. Thus, the decrypting processor 27 functions to decrypt the encrypted data encryption key contained in the encryption document using the private key. However, because the private key cannot be read out from the IC card in this exemplary embodiment, the decrypting processor 27 sends the encrypted data encryption key to the IC card to request the IC card to decrypt the encrypted data encryption key. In the IC card, the received encrypted data encryption key is decrypted using the private key retained in the IC card, and a data decrypting key obtained as a result of the decrypting is returned from the IC card to the decrypting processor 27. The data processor 22 decrypts the encryption document using the data decrypting key received at the decrypting processor 27 to generate plain text, and activates the printer engine 6 to print the plain text. Here, it is not necessary to perform the printing every time a page of plain text is generated, and the printing may be performed as batch processing after all the pages of the encryption document are decrypted into plain text.

In this example, the private key is used only once for decrypting the encrypted encryption key. When the private key processing completion detector 23 detects completion of the decrypting of the encryption key (when yes is determined in step 130), the user verification state resetting unit 24 resets the verified state of the user established in the IC card as a result of authenticating the user to the unverified state (step 140). Then, the removal permission notifying unit 25 notifies the user that removal of the IC card has been enabled by the completion of the private key processing (step 150).

In the previous example, because the digital signature should be attached to each page, the private key processing takes quite a long time until completion of the processing. In contrast to this, because the decrypting using the private key in this example is complete through only one execution, it is highly likely that the private key processing will finished at a relatively earlier time (before the user moves away from the image forming apparatus 20). Accordingly, the notification in step 150 is preferably displayed on the operation panel 3 rather than being transmitted via e-mail suitable for sending the notification to a user existing at a remote site.

Because, according to this exemplary embodiment, the verified state of the user established in the IC card as the result of authenticating the user is changed to the unverified state immediately upon completion of the processing performed using the private key stored in the IC card, unauthorized use of the private key stored in the IC card can be prevented in a reliable way even when the IC card remains inserted in the image forming apparatus 20.

In this exemplary embodiment, the image forming apparatus 20 resets the user verification state in the IC card to the unverified state to thereby prevent the unauthorized use of the private key. However, only through the notification of completion of the private key processing, the user can be immediately notified that the IC card is removable from the image forming apparatus 20. As a result, the user is able to get back to the location of the image forming apparatus 20 at an appropriate time, which, contrasting with a conventional apparatus including no unit for notifying completion of the private key processing, can produce the effect of preventing the unauthorized use of the private key.

Exemplary Embodiment 2

Figure 5:
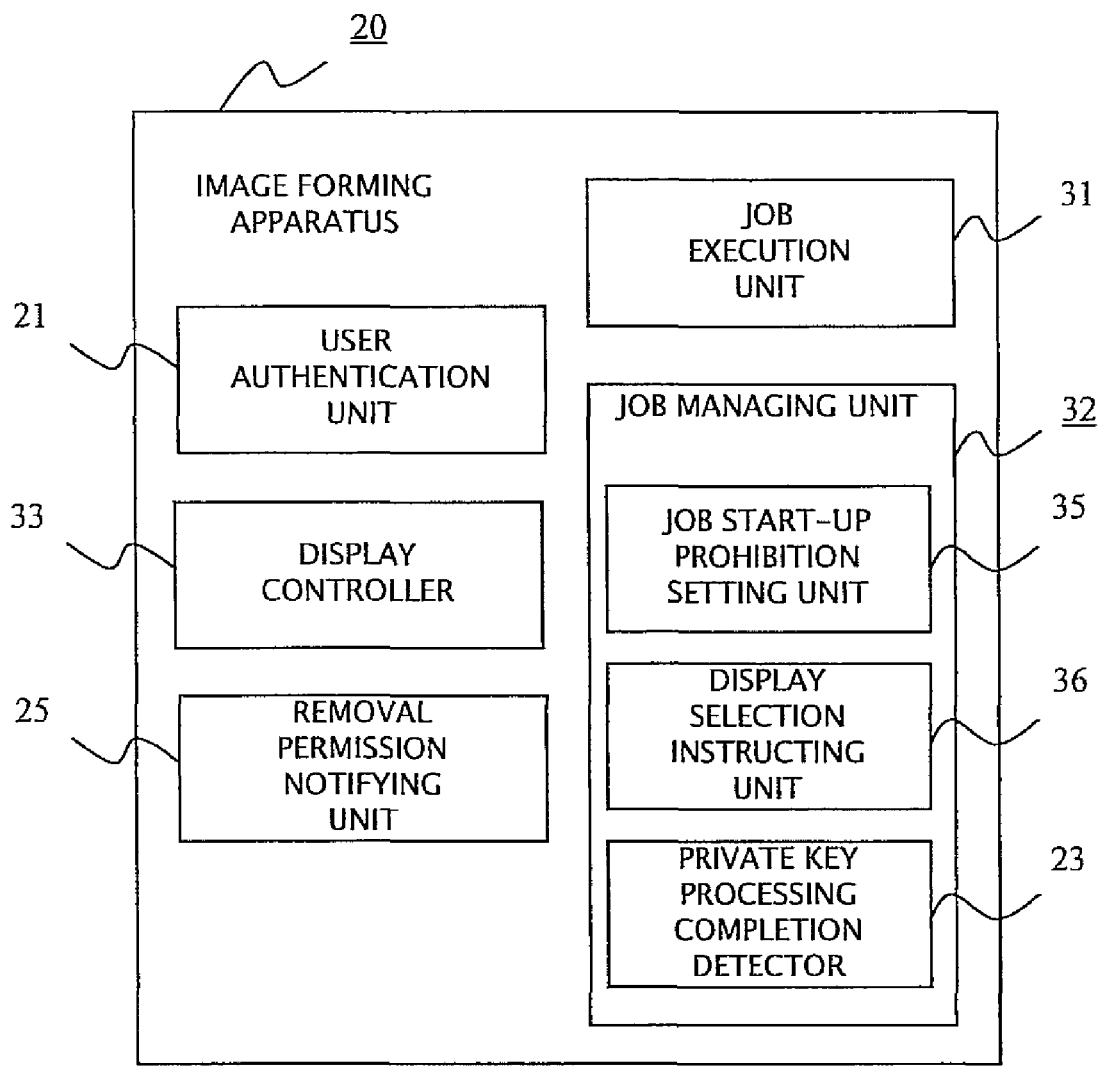
FIG. 5 is a block diagram showing a configuration of an image forming apparatus according to the second exemplary embodiment.

FIG. 5 is a block diagram showing a configuration of the image forming apparatus 20 according to a second exemplary embodiment of the present invention. Components which are not related to the description for Exemplary Embodiment 2 are not illustrated in FIG. 5. The image forming apparatus 20 includes, in addition to the user authentication unit 21, the private key processing completion detector 23, and the removal permission notifying unit 25 which are identical to those in Exemplary Embodiment 1, a job execution unit 31, a job managing unit 32, and a display controller 33. The job execution unit 31 is a component similar to the data processor 22 in previous Exemplary Embodiment 1, yet referred to as the job execution unit in order to clarify a point that a data processing performed in this exemplary embodiment is executed as a job. The private key processing is performed in the job to be executed by the job execution unit 31. The job managing unit 32 for managing execution of the job in the job execution unit 31 includes a job start-up prohibition setting unit 35 and a display selection instructing unit 36 as units for prohibiting, upon the starting of a job including the private key processing to be performed in the job execution unit 31, new execution of another job. Upon the starting of the job including the private key processing, the job start-up prohibition setting unit 35 establishes a start-up prohibition mode in which a new job is not started even if a job start-up request is received. The setting as to whether or not the start-up prohibition mode is defined may be internally retained, for example, as flag information. The job managing unit 32 controls start-up of a job based on the setting of the start-up prohibition mode. Further, the display selection instructing unit 36 instructs the display controller 33 to change display on the operation panel 3 to an illegal operation preventing screen upon the starting of the job including the private key processing. The display controller 33 for controlling display on the operation panel 3 displays the illegal operation preventing screen on the operation panel 3, as described above, in accordance with the instruction from the display selection instructing unit 36.

Each component 21, 25, and 31~33 in the image forming apparatus 20 may be implemented by cooperative operation of the computer mounted in the image forming apparatus 20 and the programs running on the CPU 1 mounted in the computer.

In addition, the programs used in this exemplary embodiment may, of course, be supplied via the communication unit, or may be supplied from the computer readable recording medium in which the programs are stored, such as the CD-ROM or the DVD-ROM. The programs supplied from the communication unit or the recording medium are installed in the computer, and the installed program are sequentially run by the CPU 1 in the computer to implement various processing.

Figure 6:
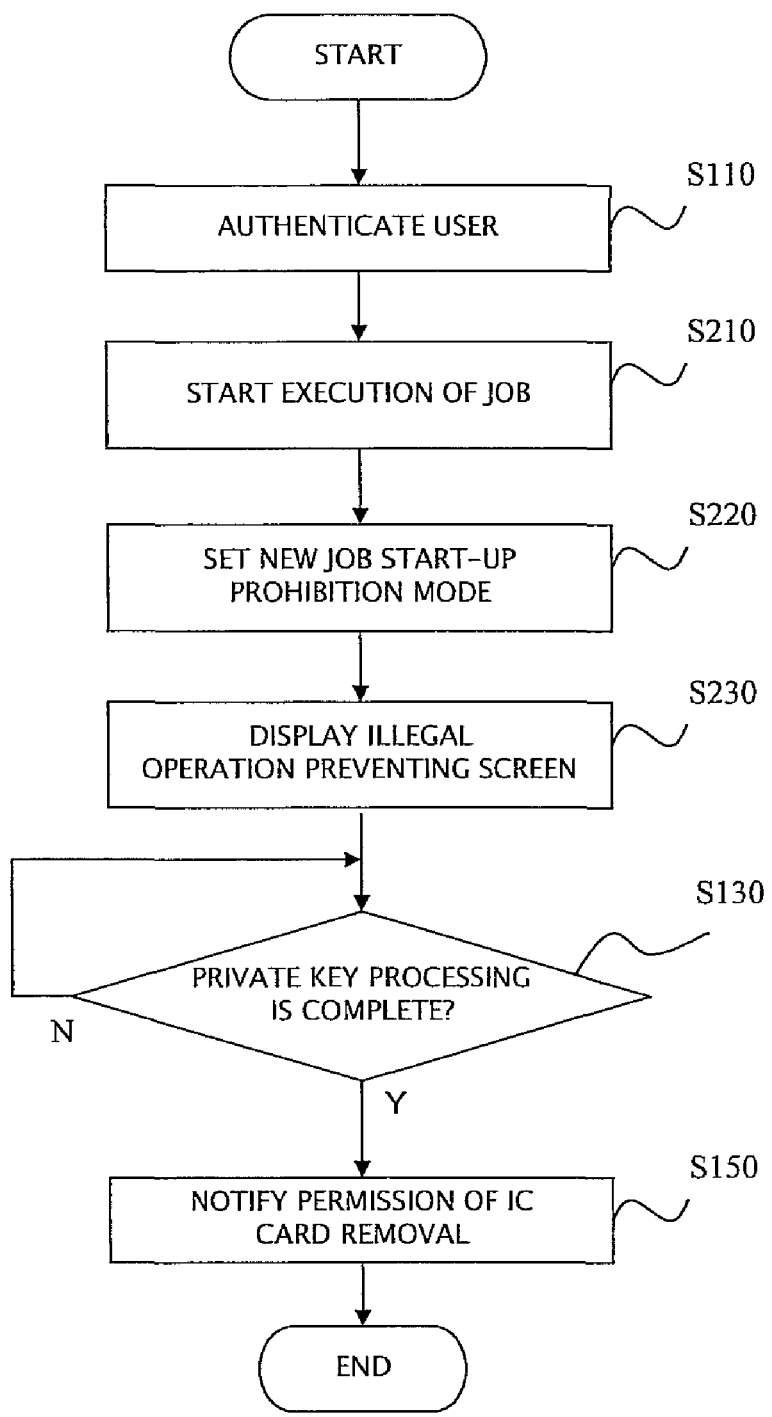
FIG. 6 is a flowchart showing a processing to implement a job including private key processing according to the second exemplary embodiment.

Next, process steps for executing the job including the private key processing according to this exemplary embodiment will be described with reference to a flowchart shown in FIG. 6. It should be noted that process steps identical to those in Exemplary Embodiment 1 are identified by identical step numbers, and descriptions related to these steps are not repeated.

After a user inputs the PIN from the log-in screen displayed on the operation panel 3 subsequent to the insertion of the IC card owned by the user into the IC card reader 10, the user authentication unit 21 authenticates the user in response to the above-described user operation (step 110). Here, it is assumed that the authenticated user wants to add a digital signature to a scanned document and send the signed document to another user. In this case, the user instructs the scanning of an original document and attachment of the digital signature from the predetermined operation screen on the operation panel 3, and pushes down the start button after placing the original document on the scanner 4.

When the start button is pushed down, the job managing unit 32 in the image forming apparatus 20 instructs the job execution unit 31 to execute the job (step 210). In response to the instruction, the job execution unit 31 starts the job. In this job, the scanner 4 reads out the original document to generate a scanned image to which the digital signature is attached.

After the job is started as described above, the job start-up prohibition setting unit 35 specifies the start-up prohibition mode (step 220). In addition, the display controller 33 switches the display on the operation panel 3 to the illegal operation preventing screen in accordance with an instruction from the display selection instructing unit 36 (step 230).

Subsequent to that, the private key processing completion detector 23 performs continuous monitoring until attachment of the digital signature is completed for the active job (as long as no is determined in step 130). When the private key processing completion detector 23 detects completion of the private key processing from the fact that generation of the final digital signature to be attached to the last scanned image (the last page) is finished (when yes is determined in step 130), the removal permission notifying unit 25 notifies the authenticated user that the IC card has become removable due to completion of the private key processing (step 150).

In this exemplary embodiment in which the job is executed as described above, upon receipt of a request for starting a new job before the authenticated user logs out, the job managing unit 32 does not start the new job because of the realization that the start-up prohibition mode is specified.

FIG. 4C schematically shows a relationship among events caused by the user operation or the data processing, the user verification state in the IC card controlled by the image forming apparatus 20, and a period in which there is the possibility that the private key will be illegally used by the third party. Now, the user verification state in the IC card controlled by the image forming apparatus 20 will be reviewed along the above-described processing flow with reference to FIG. 4C.

When a user is authenticated upon input of the PIN following the insertion of the IC card into the IC card reader 10, the IC card put into the user verified state as described above. Further, upon the starting of the job, the job start-up prohibition mode is established as described above, and at the same time, the illegal operation preventing screen is displayed. Because, in the job according to this exemplary embodiment, the scanning of the original document is started concurrently with the starting of execution of the job, the starting of execution of the job is described in FIG. 4C as "scan start-up" to allow comparison of FIG. 4C with FIGS. 4A and 4B. Then, in response to automatic log-out invoked by removal of the IC card, the image forming apparatus 20 changes the setting of user verification state in the IC card from the verified state to the unverified state. It should be noted that this exemplary embodiment may be combined with a configuration according to Exemplary Embodiment 1 in which the image forming apparatus 20 resets the user verification state in the IC card to the unverified state at the time when the private key stored in the IC card becomes unnecessary due to completion of digital signature attachment. However, the configuration is not adopted in Exemplary Embodiment 2 in view of clarifying characteristic features of Exemplary Embodiment 2.

As can been seen from FIG. 4C, it is established that, upon the starting of the job, start-up of a new job is disabled in this exemplary embodiment. Accordingly, even when the third party wants to start the new job in an attempt to abuse the IC card inserted in the IC card reader 10, the attempt can be prevented before it occurs.

Further, the switching of display on the operation panel 3 to the illegal operation preventing screen is performed in conjunction with the setting for prohibiting job start-up in this exemplary embodiment. The illegal operation preventing screen is a display screen designed to make the third party who is viewing the display on the operation panel 3 get the wrong idea that the image forming apparatus 20 is in a state incapable of initiating a new job at the present time. For example, a log-out screen indicating a state where no user is logged in, a PIN input screen, or the like may be displayed for disguising the image forming apparatus 20 as being in the user unauthenticated state or disguising the user verification state in the IC card as being in the unverified state. Alternatively, a screen on which no input operation button is contained may be used. Further, the operation panel 3 may be displayed in a condition where nothing is displayed, or in a condition incapable of accepting an input. As such, the start-up of a new job is prevented by displaying a camouflage screen on the operation panel 3.

In Exemplary Embodiment 1, unauthorized use by the third party is prevented by eliminating the period in which misuse is unpreventable. On the other hand, Exemplary Embodiment 2 is characterized by providing a unit for preventing the start-up of a new job to prevent unauthorized use during the misuse unpreventable period, rather than eliminating the misuse unpreventable period.

It should be noted that the exemplary embodiments have been described based on the premise that the instructed data processing (or job) includes the private key processing and the private key is used only once or several times in succession, for the convenience of description. It is necessary that whether or not the instructed data processing (or job) includes the private key processing and whether or not the private key processing is finished be previously recognized from details of the instruction for the data processing (or job).

Further, in the above exemplary embodiments, the present invention has been described using the example in which the image forming apparatus 20 is used as an information processing apparatus, and the private key stored in the IC card is used for digital signature attachment or the printing of an encryption document. However, the present invention may be applied to general-purpose computers or devices equipped with a computer such as the above-described image forming apparatus 20, and the information processing apparatus is not limited to the image forming apparatus 20. In addition, combination of the above-described Exemplary Embodiments 1 and 2 is applicable depending on details of the processing to be performed or on the configuration of the information processing apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. An information processing apparatus configured to:
   authenticate a user in a condition where an authentication medium used for authenticating the user is inserted, the authentication medium storing personal identification information of the user, a private key, and a software program for using the private key and,
   wherein the information processing apparatus comprises:
   a processor, implemented at least partially in hardware, for running the software program, to thereby establish a verified state in which the user is allowed to use the information processing apparatus;
   a data processor that performs data processing including processing related to the private key stored in the authentication medium; and,
   wherein the information processing apparatus is further configured to:
   detect completion of the private key related processing performed by the data processor; and
   change the verified state of the user having been established as a result of authenticating the user to a user unverified state, based on detection of the completion of the private key related processing in the processing completion detector.

2. The information processing apparatus according to claim 1, wherein the data processor comprises a signature processor that attaches a digital signature to an input electronic document, the digital signature being generated based upon the private key stored in the authentication medium.

3. The information processing apparatus according to claim 1, wherein the data processor comprises a decrypting processor that decrypts an input encrypted electronic document using a decryption key, the decryption key being generated based upon the private key stored in the authentication medium.

4. The information processing apparatus according to claim 1, wherein the information processing apparatus is further configured to notify the user of completion of the private key related processing based on detection of the completion of the private key related processing in the processing completion detector.

5. The information processing apparatus according to claim 1, wherein the private key, stored in the authentication medium, is prohibited from being read out from the authentication medium.

6. A non-transitory computer readable medium for storing an information processing program causing a computer to execute a process comprising:
   authenticating a user in a condition where an authentication medium used for authenticating the user is inserted, the authentication medium storing personal identification information of the user, a private key, and a software program for using the private key and including a processor for running the software program, to thereby establish a verified state in which the user is allowed to use the computer;
   performing data processing including processing related to the private key stored in the authentication medium;
   detecting completion of the private key related processing; and
   based on detection of the completion of the private key related processing, changing the verified state of the user having been established as a result of authenticating the user to a user unverified state.

7. The non-transitory computer readable medium according to claim 6, wherein the private key, stored in the authentication medium, is prohibited from being read out from the authentication medium.

8. An information processing method comprising:
   authenticating a user in a condition where an authentication medium used for authenticating the user is inserted, the authentication medium storing personal identification information of the user, a private key, and a software program for using the private key and including a processor, implemented at least partially in hardware, for running the software program, to thereby establish a verified state in which the user is allowed to use the computer;
   performing data processing including private key processing in which the private key stored in the authentication medium is used;
   detecting completion of the private key processing; and
   based on detection of the completion of the private key processing, changing the verified state of the user having been established as a result of authenticating the user to a user unverified state.

9. An information processing apparatus configured to: authenticate a user in a condition when an authentication medium, used for authenticating the user, is inserted, the authentication medium storing personal identification information of the user, a private key, and a software program for using the private key and,
   wherein the information processing apparatus comprises,
   a processor, implemented at least partially in hardware, for running the software program, to thereby establish a verified state in which the user is allowed to use the information processing apparatus;
   a signature processor that generates a digest from an input electronic document, the digest and the private key stored in the authentication medium being used to create a digital signature, which is to be attached to the input electronic document; and,
   wherein the information processing apparatus is further configured to change the verified state of the user having been established as a result of authenticating the user to a user unverified state after the digital signature is created and before the user is logged out from the information processing apparatus.

10. The information processing apparatus according to claim 9, wherein the user is logged out from the information processing apparatus when the authentication medium is removed from the information processing apparatus.

11. The information processing apparatus according to claim 9, wherein the private key, stored in the authentication medium, is prohibited from being read out from the authentication medium, and the authentication medium creates the digital signature from the generated digest and private key stored in the authentication medium.

* * * * *